US010329641B2

(12) United States Patent
Nomura et al.

(10) Patent No.: US 10,329,641 B2
(45) Date of Patent: Jun. 25, 2019

(54) LASER PROCESSING APPARATUS AND LASER PROCESSING METHOD

(71) Applicant: KABUSHIKI KAISHA TOSHIBA, Minato-ku (JP)

(72) Inventors: Kota Nomura, Yokohama (JP); Itaru Chida, Kawasaki (JP); Katsunori Shiihara, Yokohama (JP); Hiroya Ichikawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 831 days.

(21) Appl. No.: 14/940,474

(22) Filed: Nov. 13, 2015

(65) Prior Publication Data
US 2016/0138127 A1 May 19, 2016

(30) Foreign Application Priority Data

Nov. 17, 2014 (JP) ................................ 2014-233028

(51) Int. Cl.
*B23K 26/38* (2014.01)
*C21D 10/00* (2006.01)
(Continued)

(52) U.S. Cl.
CPC ............ *C21D 10/005* (2013.01); *B23K 26/06* (2013.01); *B23K 26/0622* (2015.10);
(Continued)

(58) Field of Classification Search
CPC .... B23K 10/005; B23K 26/106; B23K 26/06; B23K 26/18; B23K 26/146; B23K 26/0622; C21D 10/005; C21D 7/04
(Continued)

(56) References Cited

U.S. PATENT DOCUMENTS 4,937,421 A * 6/1990 Ortiz, Jr. ................ B23K 26/18
219/121.68
5,911,890 A * 6/1999 Dulaney ................ B23K 26/06
148/525
(Continued)

FOREIGN PATENT DOCUMENTS

CN 103358018 A 10/2013
JP 5-110181 A 4/1993
(Continued)

OTHER PUBLICATIONS

Office Action dated Mar. 15, 2017 in Korean Patent Application No. 10-2015-0160151 (with English language translation).
(Continued)

*Primary Examiner* — David B Jones
(74) *Attorney, Agent, or Firm* — Oblon, McClelland, Maier & Neustadt, L.L.P.

(57) ABSTRACT

One embodiment of the laser processing apparatus is for surface treatment by supplying liquid to a surface of the target member and irradiating pulsed laser light to the surface of the target member via the liquid. The apparatus includes a laser oscillator and a liquid supply. The laser oscillator irradiates the laser light to the surface through the liquid via an optical window. The liquid supply is configured to supply the liquid to the surface of the target member via a flow path passing on an outer surface of the optical window. When the liquid is in contact with a laser light emission surface of the optical window, the laser light emission surface transmits the laser light. When the liquid is not in contact with the laser light emission surface, the laser light emission surface reflects the laser light.

6 Claims, 6 Drawing Sheets

(51) Int. Cl.
*B23K 26/06* (2014.01)
*B23K 26/10* (2006.01)
*B23K 26/146* (2014.01)
*B23K 26/0622* (2014.01)
*B23K 26/18* (2006.01)
*C21D 7/04* (2006.01)

(52) U.S. Cl.
CPC .......... *B23K 26/106* (2013.01); *B23K 26/146* (2015.10); *B23K 26/18* (2013.01); *C21D 7/04* (2013.01)

(58) Field of Classification Search
USPC .............................................................. 72/56
See application file for complete search history.

(56) References Cited

U.S. PATENT DOCUMENTS

| | | | | |
|---|---|---|---|---|
| 6,002,102 A | * | 12/1999 | Dulaney | ................ B23K 26/06 219/121.85 |
| 6,163,012 A | * | 12/2000 | Kimura | ................ B23K 26/106 219/121.63 |
| 7,137,282 B2 | * | 11/2006 | Westley | ............... C21D 10/005 72/53 |
| 9,029,730 B2 | * | 5/2015 | Adachi | .................... C21D 7/06 219/121.82 |
| 9,583,225 B2 | * | 2/2017 | Uehara | ................ B23K 26/128 |
| 2012/0074105 A1 | | 3/2012 | Okamoto et al. | |
| 2012/0074110 A1 | | 3/2012 | Zediker et al. | |

FOREIGN PATENT DOCUMENTS

| | | |
|---|---|---|
| JP | 2003-53564 A | 2/2003 |
| JP | 2005-313191 | 11/2005 |
| JP | 4868729 | 2/2012 |
| WO | WO 2011/004437 A1 | 1/2011 |

OTHER PUBLICATIONS

Office Action dated Apr. 24, 2018 in Japanese Patent Application No. 2014-233028 (with English language translation) citing documents therein, 6 pages.
Extended European Search Report dated Apr. 20, 2016 in Patent Application No. 15194440.2.

* cited by examiner

LASER PROCESSING APPARATUS AND LASER PROCESSING METHOD

CROSS REFERENCE TO RELATED APPLICATION

This application is based upon and claims the benefit of priority from Japanese Patent Application No. 2014-233028, filed on Nov. 17, 2014; the entire contents of which are incorporated herein by reference.

FIELD

Embodiments described herein relate generally to a laser processing apparatus and a laser processing method.

BACKGROUND

For example, at regular inspection of an atomic power plant, an automatic instrument is placed in a reactor to get access to devices in the reactor and various maintenance methods are executed. The methods include laser peening as a technique capable of effectively preventing the occurrence of SCC (Stress Corrosion Cracking) resulting from a tensile stress remaining at a welded portion.

A principle of the laser peening will be described. Laser light having a pulse width of about several nanoseconds (ns) is condensed to a spot of a diameter of an about 1 mm by a condensing lens to be irradiated to a member to be treated (target member). As a result, a surface of the member to be treated absorbs energy to form into plasma. In the case where the periphery of the plasma is covered with liquid or paint having a transparency with respect to a wavelength of the laser light, expansion of the plasma is hindered. Consequently, internal pressure of the plasma reaches about several gigapascals (GPa) to make an impact on the member to be treated. In this event, a strong shock wave occurs and propagates in the material to cause plastic deformation and change the residual stress into a compressed state.

The laser peening less depends on a material strength and is capable of processing the member to be treated up to its inner part with a plate thickness of about 1 mm from a surface of the member to be treated, as compared with another peening technique such as a shot peening, a water-jet peening or the like. Further, the laser peening provides excellent processability at a confined portion because there is no reaction force during the processing and its processing apparatus can be easily downsized.

In the conventional laser processing apparatus used in a pipe, a processing target portion is desirably in an underwater environment, but the processing is sometimes forced to be executed in gas. For example, when a processing target is not sunk very deep in a water tank, the processing target in the gas is irradiated with laser light while being supplied with liquid such as water. However, when the supply of the liquid is stopped or its supply amount reduces due to some trouble, there is a possibility that the laser light that has propagated in the gas is irradiated to the processing target. When the laser light propagates in the gas, a focal length changes as compared with the case where it propagates in water. In this case, there is a possibility that the laser light is converged to be irradiated to the processing target. Since the focused laser light has a high energy density, there is a possibility that the laser light damages the processing target portion in the worst case.

DETAILED DESCRIPTION

One embodiment of the laser processing apparatus is for surface treatment by supplying liquid to a surface of the target member and irradiating pulsed laser light to the surface of the target member via the liquid. The apparatus includes a laser oscillator and a liquid supply. The laser oscillator is configured to irradiate the laser light to the surface through the liquid via an optical window. The liquid supply is configured to supply the liquid to the surface of the target member via a flow path passing on an outer surface of the optical window. When the liquid is in contact with a laser light emission surface of the optical window, the laser light emission surface transmits the laser light. When the liquid is not in contact with the laser light emission surface, the laser light emission surface reflects the laser light.

One embodiment of the laser processing method is for surface treatment of a target member in a gaseous atmosphere by supplying liquid to a surface of the target member and irradiating pulsed laser light to the surface via the liquid. The method includes preparing a laser oscillator configured to irradiate the laser light to the surface through the liquid via an optical window and a liquid supply configured to supply the liquid to the surface via a flow path passing on an outer surface of the optical window, and changing an optical path of the laser light from a first optical path to a second optical path due to a difference in refractive index between the liquid and the gaseous atmosphere. When the liquid is supplied to an outer side of the optical window from the liquid supply, the laser light passes through the first optical path to reach the surface. When the liquid is not supplied to the outer side of the optical window from the liquid supply, the laser light passes through the second optical path not to reach the surface.

Figure 1:
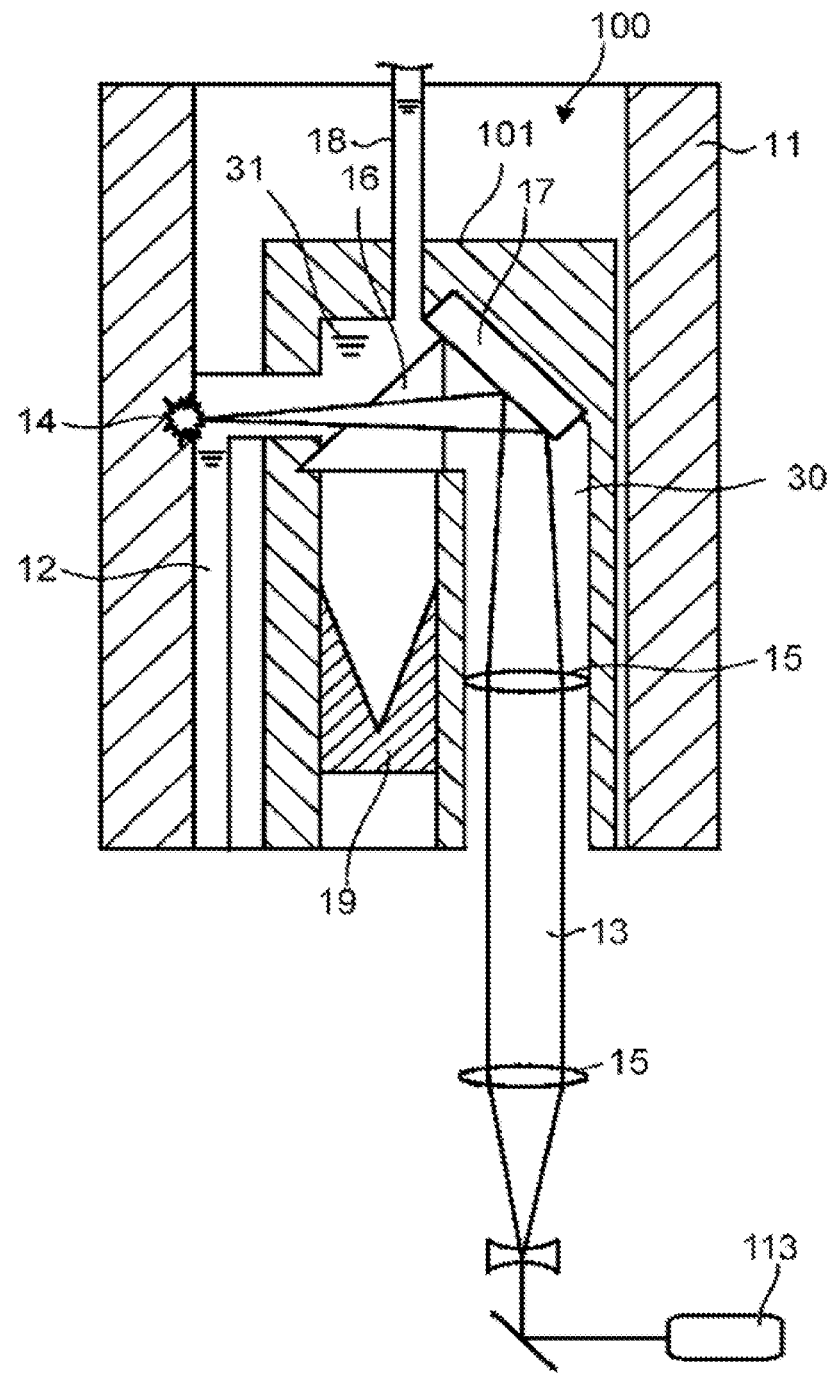
FIG. 1 is a view illustrating a schematic configuration of an essential part of a laser processing apparatus of a first embodiment.

FIG. 1 is a view illustrating a schematic configuration of an essential part of a laser processing apparatus 100 according to a first embodiment. As illustrated in FIG. 1, the laser processing apparatus 100 includes a laser irradiation head 101 which is inserted in an inner part of a pipe 11 or the like to process an inner surface of the pipe 11.

The laser irradiation head 101 has a cylindrical shape and inside the laser irradiation head 101, an optical path 30 for spatial transmission of laser light 13 is formed. Laser irradiation head 101 may be coupled with a mechanical driver (not shown in FIG. 1) as described later with reference to FIG. 9. A laser oscillator 113 configured to irradiate laser light 13 in optical path 30 is provided outside of irradiation head 101, such as in the mechanical driver. In the optical path 30, optical components such as a condensing lens 15, a mirror 17, and/or so on such as convergent lens or prisms are disposed. Some of the optical components may be disposed between laser irradiation head 101 and laser oscillator 113 provided outside of the laser irradiation head 101 such as in the mechanical driver. Thus, in this embodiment, the laser light 13 is spatially transmitted from the laser oscillator 113, which can make a focal length of the laser light 13 longer than in a case of fiber transmission. Laser oscillator 113 and/or all the optical components may be provided in laser irradiation head 101.

At a terminal end portion of the optical path 30, a prism 16 constituting an optical window is disposed, and the laser light 13 is irradiated to a processing target portion 14 via the prism 16. Further, a liquid supply pipe 18 is configured to supply liquid 12 such as water is connected to the laser irradiation head 101. In the laser irradiation head 101, a flow path 31 where to pass the liquid 12 supplied from the liquid supply pipe 18 is formed. Through the flow path 31, the liquid 12 is supplied to the vicinity of the processing target portion 14 of the pipe 11 after passing on an outer surface of the prism 16 or in the vicinity thereof.

In this embodiment, refractive indexes n1, n2 of the liquid 12 and the prism 16 have approximate values, and a difference in the refractive index between the liquid 12 and the prism 16 is smaller than a difference in refractive index between the air (gaseous atmosphere) and the prism 16. Therefore, in a state where the liquid 12 is flowing on the outer side of the prism 16, the laser light 13 reflected by the mirror 17 to enter the inside of the prism 16 travels substantially straight as it is to be irradiated to the processing target portion 14 (first optical path).

Figure 2:
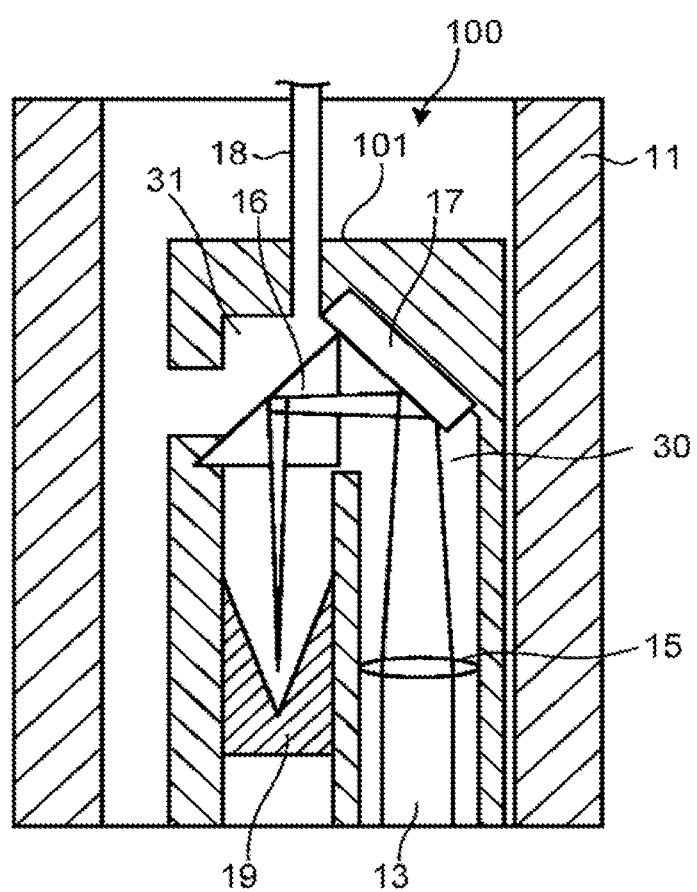
FIG. 2 is a view illustrating a state where supply of liquid is stopped in the laser processing apparatus of the first embodiment.

On the other hand, in a state where the supply of the liquid 12 from the liquid supply pipe 18 is stopped and the liquid 12 is not flowing on the outer side of the prism 16, the air (gaseous atmosphere) instead of the liquid 12 exists on the outer side of the prism 16, as illustrated in FIG. 2. Then, due to a large difference in the refractive index between the prism 16 and the air (gaseous atmosphere), the laser light 13 reflected by the mirror 17 to enter the inside of the prism 16 is reflected on a boundary between the prism 16 and the air (gaseous atmosphere), so that the laser light 13 is not irradiated to the processing target portion 14 (second optical path). In this embodiment, a beam dump 19 is disposed in the laser irradiation head 101, and the laser light 13 reflected on the boundary between the prism 16 and the air (gaseous atmosphere) enters the beam dump 19.

The beam dump 19 absorbs the entering laser light 13 and does not practically reflect the laser light 13. For example, by disposing a plurality of absorber plates that absorb the laser light, in a stacked manner so that they face one another, it is possible to form the beam dump 19. The laser light 13 which has entered the beam dump 19 is absorbed while repeatedly reflected among the plural absorber plates, and is not practically emitted from the beam dump 19.

A later-described energy detector 20 is usable in place of the beam dump 19, provided that it does not practically reflect the laser light which has entered.

In the laser processing apparatus 100 having the above-described configuration, when the liquid 12 is being supplied from the liquid supply pipe 18, the laser light 13 is irradiated to the processing target portion 14 via the liquid 12 and a laser peening process is executed. Then, when the supply of the liquid 12 from the liquid supply pipe 18 is stopped because of some reason, the laser light 13 is not irradiated to the processing target portion 14 and the laser light 13 enters the beam dump 19. Therefore, it is possible to prevent that the laser light 13 which has passed in the gas to be undesirably in a condensed state due to the absence of the liquid 12 is irradiated to the processing target portion 14 to damage the processing target portion 14.

Further, in the laser processing apparatus 100, owing to the spatial transmission of the laser light 13, it is possible to make the focal length of the laser light 13 longer than in the case of the fiber transmission. This allows the optical components to be disposed at positions distant from the processing target portion 14, which can suppress breakage of the optical components by a shock wave or the like of plasma generated at the processing target portion 14.

As described above, according to the laser processing apparatus 100 of this embodiment, even if the supply of the liquid 12 is stopped when the processing is executed in the gas while the liquid 12 is supplied, it is possible to reduce a possibility that a surface to be processed is damaged, which enables safe and good processing. Hereinafter, second to seventh embodiments will be described, and these second to seventh embodiments can also exhibit similar operations and effects to those of the above-described first embodiment.

Figure 3:
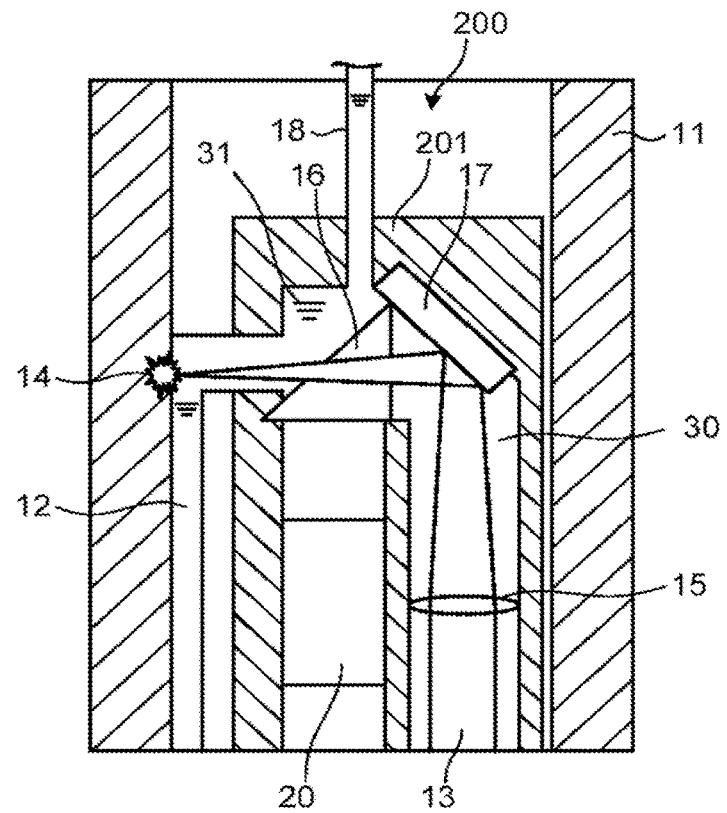
FIG. 3 is a view illustrating a schematic configuration of an essential part of a laser processing apparatus of a second embodiment.

FIG. 3 illustrates a schematic configuration of an essential part of a laser processing apparatus 200 according to a second embodiment. The laser processing apparatus 200 according to the second embodiment includes a laser irradiation head 201. In this laser irradiation head 201, the beam dump 19 of the laser irradiation head 101 in the first embodiment is replaced by the energy detector 20 which is configured to measure energy of laser light 13. Since the other configuration is the same as that of the laser processing apparatus 100 according to the first embodiment, corresponding parts are denoted by the same reference numerals, and a repeated description thereof will be omitted.

As the aforesaid energy detector 20, a power meter or a photodiode is usable, for instance. By thus measuring power of the laser light 13 guided to the energy detector 20 at the time except during the execution of the processing, it is possible to calculate soundness of an optical system and the power of the laser light 13 at the processing target portion (processing point) 14 at the time of the execution of the processing.

Alternatively, as the energy detector 20, a sensor capable of measuring an irradiation position of the laser light 13 is usable. In this case, it is possible to correct deviation of an optical axis of the laser light 13 by measuring the irradiation position of the laser light 13 and feeding back the measured irradiation position.

Figure 4:
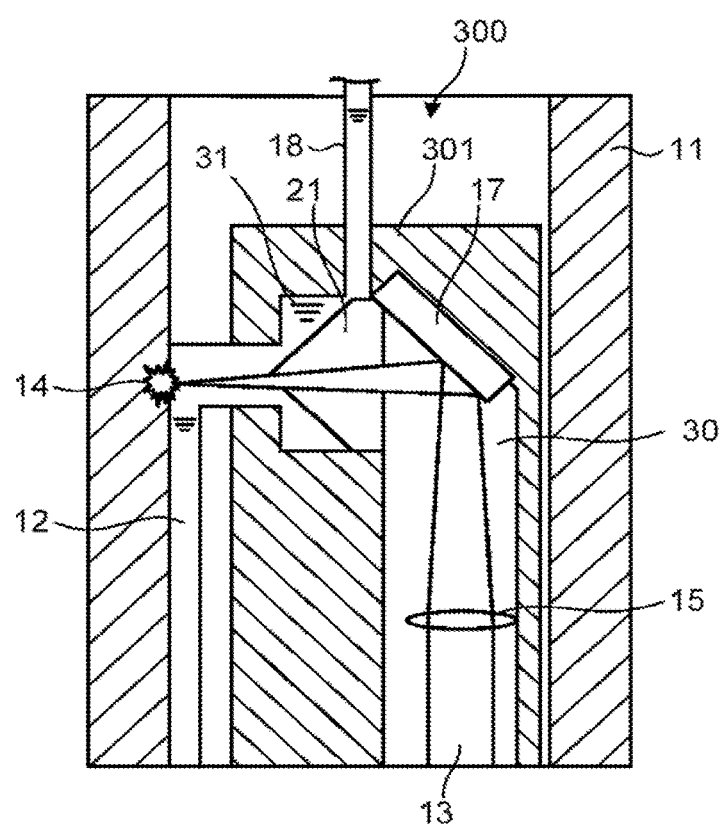
FIG. 4 is a view illustrating a schematic configuration of an essential part of a laser processing apparatus of a third embodiment.

FIG. 4 illustrates a schematic configuration of an essential part of a laser processing apparatus 300 according to a third embodiment. The laser processing apparatus 300 according to the third embodiment includes a laser irradiation head 301. In this laser irradiation head 301, the prism 16 constituting the optical window disposed at the terminal end portion of the optical path 30 in the first embodiment is replaced by an optical component 21 having a conical shape.

Since the other configuration is the same as that of the laser processing apparatus 100 according to the first embodiment, corresponding parts are denoted by the same reference numerals, and a repeated description thereof will be omitted.

The conical optical component 21 is formed in a conical shape gradually decreasing in diameter along a traveling direction of the laser light 13, and has a refractive index approximate to that of the liquid 12, similarly to the prism 16. Therefore, a difference in the refractive index between the liquid 12 and the conical optical component 21 is smaller than a difference in refractive index between the air (gaseous atmosphere) and the conical optical component 21. Therefore, in a state where the liquid 12 from the liquid supply pipe 18 is flowing on an outer side of the conical optical component 21, the laser light 13 reflected by the mirror 17 to enter an inner part of the conical optical component 21 travels substantially straight as it is to be irradiated to the processing target portion 14. At this time, owing to the conical shape, it is possible to suppress the spread of the laser light 13. Further, providing the conical shape in a nozzle facilitates stabilizing a stream of jetting water. Therefore, it is possible to suppress the spread of the jetting liquid to form a stable jet flow over a long distance.

On the other hand, in a state where the supply of the liquid 12 from the liquid supply pipe 18 is stopped and the liquid 12 is not flowing on the outer side of the conical optical component 21, the air (gaseous atmosphere) instead of the liquid 12 exists on the outer side of the conical optical component 21. Then, due to a large difference in the refractive index between the conical optical component 21 and the air (gaseous atmosphere), the laser light 13 reflected by the mirror 17 to enter the inside of the conical optical component 21 is reflected on a boundary between the conical optical component 21 and the air (gaseous atmosphere), so that the laser light 13 is not irradiated to the processing target portion 14. That is, the laser light 13 diffuses in a circumferential direction of the optical component 21 to be irradiated to an inner wall surface of the laser irradiation head 31. Since the laser light 13 is scattered, an energy density of the laser light 13 when it is irradiated to the inner wall surface of the laser irradiation head 31 is low, which eliminates a need for specially providing the beam dump. At this time, if a tip of the conical shape is included in an emission surface of the laser light 13, the diffusion effect is enhanced. However, if at least a conical surface is included, the diffusion effect is obtained.

Figure 5:
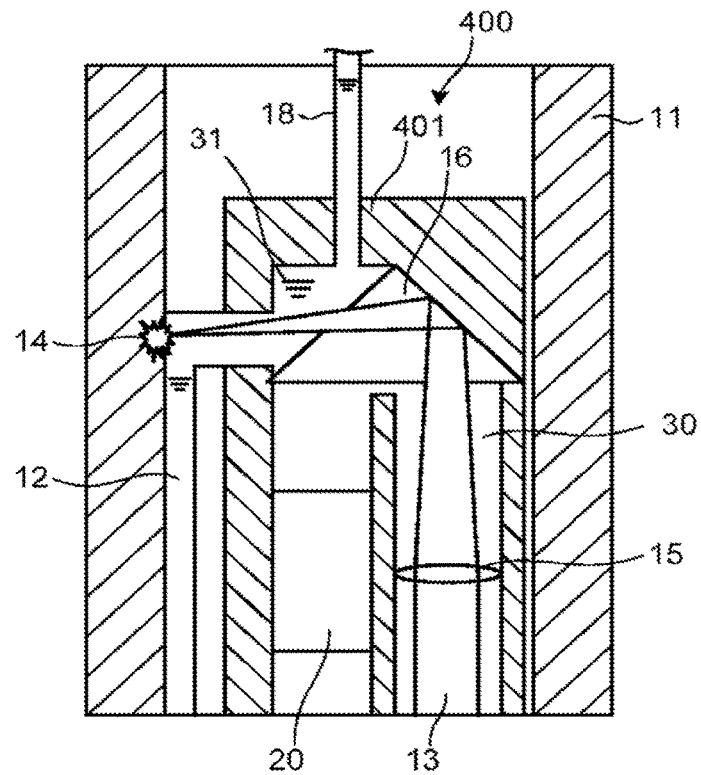
FIG. 5 is a view illustrating a schematic configuration of an essential part of a laser processing apparatus of a fourth embodiment.

FIG. 5 illustrates a schematic configuration of an essential part of a laser processing apparatus 400 according to a fourth embodiment. The laser processing apparatus 400 according to the fourth embodiment includes a laser irradiation head 401. In the laser irradiation head 401, the mirror 17 in the first embodiment is deleted, and the functions of the mirror 17 and the optical window disposed at the terminal end portion of the optical path 30 are realized by one prism 16. Since the other configuration is the same as that of the laser processing apparatus 100 according to the first embodiment, corresponding parts are denoted by the same reference numerals, and a repeated description thereof will be omitted.

In the laser processing apparatus 400 having the above-described configuration, it is possible to reduce the number of optical components as compared with the first embodiment, which can simplify an optical system. Accordingly, it is possible to improve light guiding accuracy.

Figure 6:
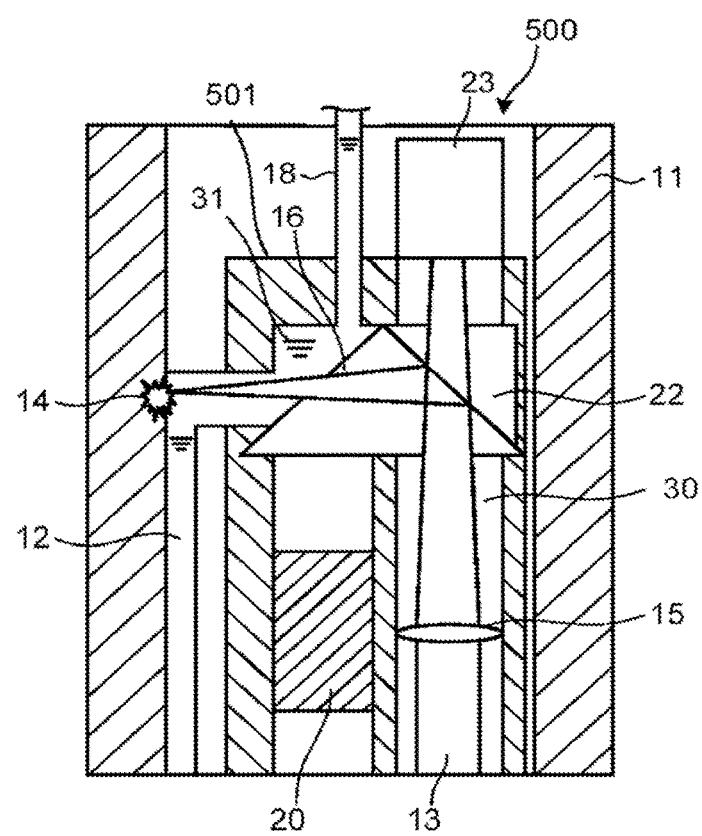
FIG. 6 is a view illustrating a schematic configuration of an essential part of a laser processing apparatus of a fifth embodiment.

FIG. 6 illustrates a schematic configuration of an essential part of a laser processing apparatus 500 according to a fifth embodiment. The laser processing apparatus 500 according to the fifth embodiment includes a laser irradiation head 501. In this laser irradiation head 501, the mirror 17 in the first embodiment is deleted, and the functions of the mirror 17 and the optical window disposed at the terminal end portion of the optical path 30 are realized by one prism 16. Further, a second prism 22 is disposed so as to be in contact with an outer side of a reflection surface, of a prism 16, which reflects laser light 13 toward a processing target portion 14. Further, a sampling laser light energy detector 23 is disposed so as to be above the second prism 22 in FIG. 6.

Further, a coating film is formed on at least one of the prism 16 and the second prism 22 so as to be interposed therebetween. The coating film constitutes as a laser light sampler that is configured to sample (or split) part of the laser light 13. The part (for example, several percent) of the laser light 13 passes through the coating film to enter the inside of the second prism 22 and is guided to the sampling laser light energy detector 23. A half mirror, beam splitter or other optical elements may also be used as the sampler, i.e. the coating. Since the other configuration is the same as that of the laser processing apparatus 100 according to the first embodiment, corresponding parts are denoted by the same reference numerals, and a repeated description thereof will be omitted.

In the laser processing apparatus 500 having the above-described configuration, power of the laser light 13 can be constantly measured by the sampling laser light energy detector 23. Further, except during the execution of the processing, the power of the laser light 13 can be measured also by the energy detector 20. Therefore, while the processing is not executed, it is possible to measure the energy by the energy detector 20 and the sampling laser light energy detector 23 to record results of these. Then, by performing the energy measurement by the sampling laser light energy detector 23 during the execution of the processing, it is possible to indirectly measure the energy of the laser light 13 at the processing target portion 14 at the time of the execution of the processing.

Further, the energy detector 20 measures energy of the laser light having been influenced by a laser light emission surface. On the other hand, the sampling laser light energy detector 23 is capable of measuring energy of the laser light having been influenced by a section up to a laser light reflection surface. Consequently, when the energy of the laser light changes due to deterioration or the like of a component of an optical system, it is possible to determine whether the change is ascribable to an influence by the laser light emission surface of the prism 16, an influence by an optical component on a preceding stage of the laser light emission surface, or an influence by the both.

Figure 7:
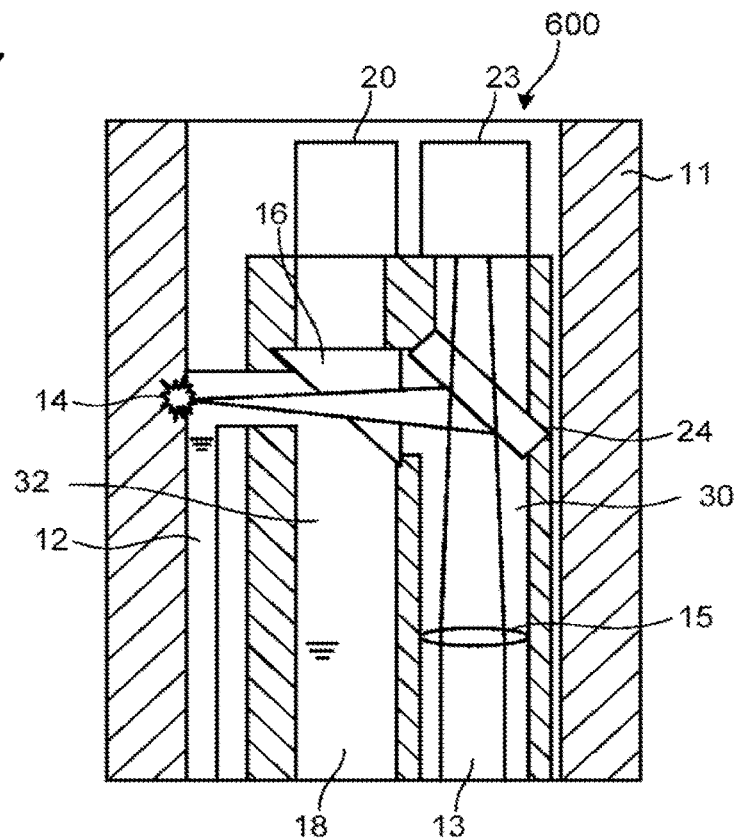
FIG. 7 is a view illustrating a schematic configuration of an essential part of a laser processing apparatus of a sixth embodiment.

FIG. 7 illustrates a schematic configuration of an essential part of a laser processing apparatus 600 according to a sixth embodiment. The laser processing apparatus 600 according to the sixth embodiment includes a laser irradiation head 601. In the laser irradiation head 601, the mirror 17 in the first embodiment is deleted and is replaced by a sampling mirror 24 that transmits part of laser light 13. Further, part of the laser light 13 which has been transmitted by the sampling mirror 24 is measured by a sampling laser light energy detector 23.

Further, a direction of a prism 16 as an optical window is changed. Therefore, when supply of liquid 12 is stopped, the laser light 13 is reflected upward in FIG. 7 to enter an energy detector 20 disposed above the prism 16. Further, a flow path 32 is formed so as to supply the liquid 12 from under in FIG. 7. Since the other configuration is the same as that of the laser processing apparatus 100 according to the first embodiment, corresponding parts are denoted by the same reference numerals, and a repeated description thereof will be omitted.

In the laser processing apparatus 600 having the above-described configuration, the same effects as those of the fifth embodiment are exhibited, and since the liquid 12 is supplied from under where an oscillator or the like of the laser light 13 is disposed, it is possible to more easily supply the liquid 12.

Figure 8:
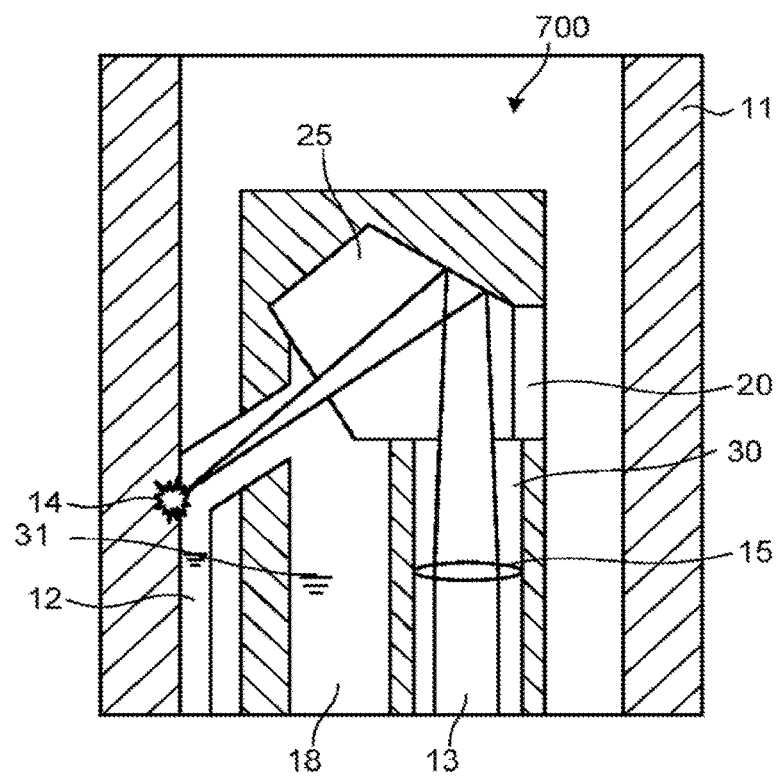
FIG. 8 is a view illustrating a schematic configuration of an essential part of a laser processing apparatus of a seventh embodiment.

FIG. 8 illustrates a schematic configuration of an essential part of a laser processing apparatus 700 according to a seventh embodiment. The laser processing apparatus 700 according to the seventh embodiment includes a laser irradiation head 701. In this laser irradiation head 701, the mirror 17 in the first embodiment is deleted and the functions of the mirror 17 and the optical window disposed at the terminal end portion of the optical path 30 are realized by one pentaprism 25.

Further, the pentaprism 25 irradiates laser light 13 diagonally to a processing target portion 14. A flow path 32 is formed so that liquid 12 is supplied from under in FIG. 8 as in the sixth embodiment. Then, when the supply of the liquid 12 is stopped, the laser light 13 reflected on a boundary between an outer side of the pentaprism 25 and a gaseous atmosphere enters an energy detector 20 disposed adjacently on the right of the pentaprism 25 in FIG. 8. Since the other configuration is the same as that of the laser processing apparatus 100 according to the first embodiment, corresponding parts are denoted by the same reference numerals, and a repeated description thereof will be omitted.

In the laser processing apparatus 700 having the above-described configuration, the laser light 13 is irradiated diagonally to the processing target portion 14 by the pentaprism 25. Therefore, it is possible to reduce risk that the pentaprism 25 being the optical window is damaged by shock and heat of plasma generated at the processing target portion 14. Further, as in the sixth embodiment, the liquid 12 is supplied from under where an oscillator or the like of the laser light 13 is disposed, which makes it possible to supply the liquid 12 more easily.

Figure 9:
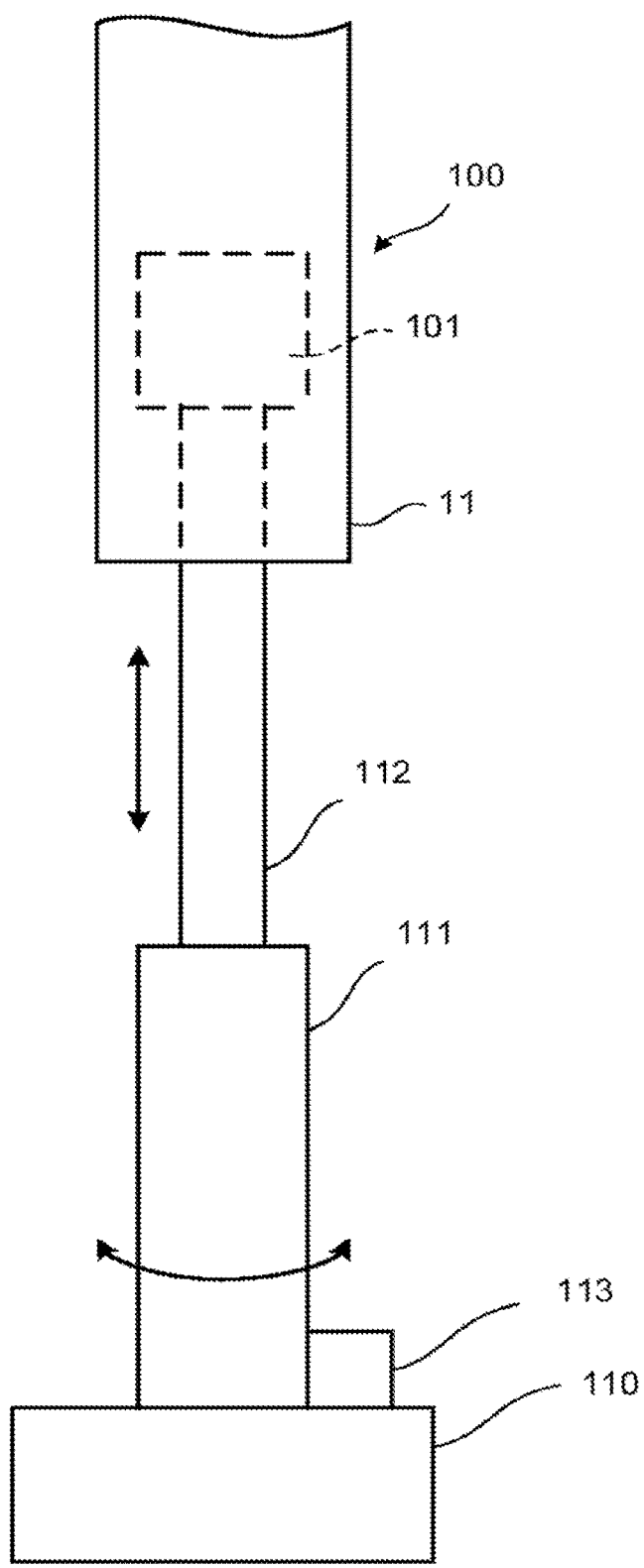
FIG. 9 is a view illustrating an example of a schematic configuration of a mechanical driver.

FIG. 9 illustrates an example of a mechanical driver configured to drive the laser irradiation heads 101, 202, 301, 401, 501, 601, 701 in the above-described first to seventh embodiments, taking, as an example, a case where the laser irradiation head 101 is driven. This mechanical driver includes: a base 110; and a vertical movement mechanism disposed on the base 110 and including an outer cylinder 111 and an inner cylinder 112. As indicated by the arrow in FIG. 9, the inner cylinder 112 is movable up and down relatively to the outer cylinder 111, and these outer cylinder 111 and inner cylinder 112 are rotatable relatively to the base 110. With this structure, the laser irradiation head 101 moves up and down and rotates in the pipe 11 to apply the processing to an inner part of the pipe 11. Note that a laser oscillator 113 or the like is disposed on the base 110.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A laser processing apparatus for surface treatment of a target member by supplying liquid to a surface of the target member and irradiating pulsed laser light to the surface via the liquid, the apparatus comprising:
    an optical window;
    a laser oscillator configured to irradiate the laser light to the surface through the liquid through the optical window; and
    a liquid supply configured to supply the liquid to the surface through a flow path passing on an outer surface of the optical window; and
    a beam dump to which the laser light reflected by the laser light emission surface is guided, wherein
    when the liquid is in contact with a laser light emission surface of the optical window, the laser light emission surface transmits the laser light, and
    when the liquid is not in contact with the laser light emission surface, the laser light emission surface reflects the laser light.

2. The laser processing apparatus according to claim 1, wherein the beam dump includes an energy detector configured to measure energy of the laser light.

3. A laser processing apparatus for surface treatment of a target member by supplying liquid to a surface of the target member and irradiating pulsed laser light to the surface via the liquid, the apparatus comprising:
    an optical window;
    a laser oscillator configured to irradiate the laser light to the surface through the liquid through the optical window;
    a liquid supply configured to supply the liquid to the surface through a flow path passing on an outer surface of the optical window,
    a laser light sampler configured to sample part of the laser light, the sampler being disposed on an optical path; and
    a sampling laser light energy detector configured to measure energy of the sampled laser light, wherein
    when the liquid is in contact with a laser light emission surface of the optical window, the laser light emission surface transmits the laser light, and
    when the liquid is not in contact with the laser light emission surface, the laser light emission surface reflects the laser light.

4. The laser processing apparatus according to claim 1, wherein the optical window is an optical component having a conical shape, and the laser light emission surface includes a conical surface of the optical component having the conical shape.

5. A laser processing method for surface treatment of a target member in a gaseous atmosphere by supplying liquid to a surface of the target member and irradiating pulsed laser light to the surface via the liquid, the method comprising:
    preparing a laser oscillator configured to irradiate the laser light to the surface through the liquid via an optical window and a liquid supply configured to supply the liquid to the surface via a flow path passing on an outer surface of the optical window, and a beam dump to which the laser light reflected by the laser light emission surface is guided; and
    changing an optical path of the laser light from a first optical path to a second optical path due to a difference in refractive index between the liquid and the gaseous atmosphere, wherein
    when the liquid is supplied to an outer side of the optical window from the liquid supply, the laser light passes through the first optical path to reach the surface, and when the liquid is not supplied to the outer side of the optical window from the liquid supply, the laser light passes through the second optical path not to reach the surface.

6. The laser processing apparatus according to claim 3, wherein the optical window is an optical component having a conical shape, and the laser light emission surface includes a conical surface of the optical component having the conical shape.

\* \* \* \* \*